United States Patent Office 2,969,993
Patented Jan. 31, 1961

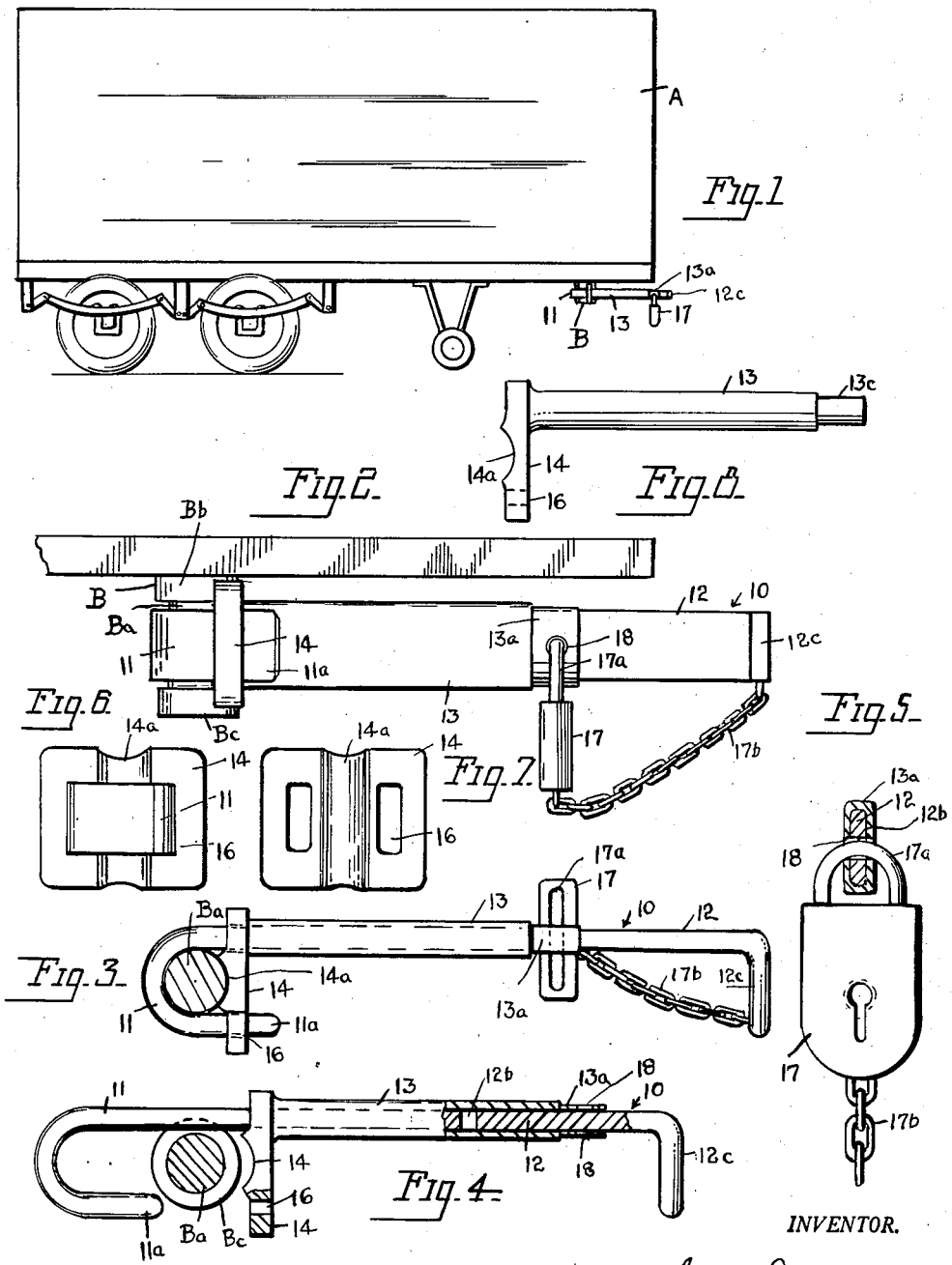

2,969,993

MEANS FOR LOCKING ROAD TRAILERS AGAINST THEFT

Harley A. Jasper, 921 S. Elm St., Centralia, Ill.

Filed Jan. 15, 1959, Ser. No. 786,977

3 Claims. (Cl. 280—433)

This invention relates to a theft preventing locking means for truck and other highway trailers, and one of its objects is to provide a simple locking means, whereby the coupling pin of a trailer, commonly known as the fifth-wheel pin, cannot be coupled to the fifth wheel carried by the rear end every pulling tractor or motorized truck unit, while the locking means is connected on or encloses the shank portion of the coupling pin of the trailer.

It is standard practice to provide all highway trailers with fifth-wheel coupling pins of standard shape and dimensions, each one of these pins being of cylindrical construction, with a reduced shank section which thereby provides two end shoulders or collars above and below this reduced shank section, and which reduced shank section is adapted to receive a coupling unit of a fifth-wheel usually mounted on the rear end of a tractor or truck unit, the whole being so arranged that free pivotal movement of the coupled parts is permitted. It is also common practice to leave freight or other trailers in parking lots, and along the sides of highways or on adjacent roads or streets, for rest periods, or during idle periods, as between jobs, or during the evening or other resting periods of the day, and due to absence of any means for protecting or guarding the coupling pin of the parked trailer, theft is made easy, so that many of these unguarded trailers are coupled to unauthorized tractors and trucks and driven off, often beyond recovery by the guilty persons operating the tractors or trailers.

The present invention is directed to provide a safe and positive lock, which will effectively prevent any unauthorized tractor or trailer from being coupled to the coupling pin of a parked trailer, and involves the use of a U-shaped bolt or locking element, which fits snugly on the reduced shank section of the trailer coupling pin, and is held in locked relation to the coupling pin by a sliding sleeve and a lock which secures the sliding sleeve from unauthorized movement on the shank of the bolt or locking member, and thereby effectively prevents the coupling pin so locked from being coupled to the fifth-wheel of an unauthorized truck or tractor, the whole being so constructed and combined that the rightful owner may quickly remove the locking unit by the use of a proper key.

The invention is carried out by means of a construction which does not require the use of a special trailer coupling pin, and when removed from a standard coupling pin of a trailer, permits of effective normal coupling of the trailer to any tractor or truck, properly equipped to pull the trailer over the highway, and is shown in the accompanying drawings, in which:

Fig. 1 is a side elevation of a conventional road trailer, showing the locking bolt applied to the coupling pin of the trailer.

Fig. 2 is a side elevation of the locking bolt, shown attached to the coupling pin of the trailer, on an enlarged scale.

Fig. 3 is a top plan view thereof.

Fig. 4 is a similar view, shown partly in longitudinal section, showing the bolt released from the coupling pin.

Fig. 5 is a detail cross sectional view, taken through the bolt, showing the relation of the padlock hasp thereto.

Fig. 6 is a detail end view, showing the bolt hook in its locked relation to the cooperating jaw of the sleeve.

Fig. 7 is a front end view of the jaw of the sleeve.

Fig. 8 is a side elevation of a modified main sleeve.

Referring to the accompanying drawings which show the practical embodiment of my invention A designates a road trailer of general standard construction, which is equipped on its forward end with a pendant coupling pin B, generally known as the fifth-wheel pin, and which is constructed of cylindrical stock and provided with a reduced central section Ba, a top circular shoulder Bb, and a bottom circular shoulder Bc. The mating element of the standard fifth-wheel coupling of the pulling tractor or truck is designed to have coupling engagement with this pin, has a bearing on the reduced central section Ba and is held against endwise displacement by the end shoulders Bb and Bc. This is old and standard construction.

My device for preventing the stealing of road trailers includes a bolt 10, shown to be rectangular in cross section, which is constructed with a straight shank 12 and a terminal locking jaw or hook 11, of general U-shaped construction. I am not restricted to the particular section of the shank shown.

The entire bolt is constructed of high strength steel of great hardness, and the terminal jaw or hook 11 is adapted to cover approximately three-quarters of the round central section Ba of the coupling pin B.

A sleeve 13 has a free sliding fit on the shank 12, and is formed on its inner end with an integral jaw 14, formed with a concave side face or seat 14a, adapted to receive the other quarter portion of the central section Ba of the pin B. This sleeve has the same cross section as the shank 12. The major area of the intermediate or reduced section Ba of the coupling pin B is shielded by the jaw or hook 11 and the balance is shielded by the concave seat 14a of the jaw 14. By these two elements access to the fifth-wheel coupling pin to couple an unauthorized tractor or truck thereto is prevented.

The integral or lateral locking head or jaw 14 of sliding sleeve 13, is formed with a slot or opening 16, designed to freely receive the terminal or outer end 11a of the hook 11, when the jaw 14 and this hook are placed in locking relation to the intermediate section Ba of the coupling pin B. This interfitting connection is shown in Figs. 2 and 3.

When the terminal bolt hook or jaw 11 and the lateral jaw 14 of the sleeve 13 thus enclose the middle section of the coupling pin, unauthorized movement of this sleeve is effectively prevented by means of a second sleeve 13a, which has a wall thinner than the first sliding sleeve, and has a cross section corresponding to that of the shank 12 of the bolt. This sliding sleeve is adapted to engage the end of the longer sleeve 13, and to be locked to the shank 12 of the bolt by means of the padlock hasp 17a of the padlock 17, which is passed through the transverse opening or holes 18 in the sleeve 13a and in the hole 12b of the bolt shank 12, when the main sleeve 13 is engaged with the coupling pin of the trailer, as previously described, and the sleeve 13a is engaged with the sleeve 13. By reducing the minimum diameter of the sleeve 13 at its rear end the auxiliary sleeve 13a may be dispensed with.

After the hasp 17a of the padlock 17 has been extended through the holes 18 of the sleeve 13a and the hole 12b of the bolt shank, the hasp may be snapped into locked position, and then only an authorized key having a coded bit capable of operating the padlock can release it and permit of the complete detachment of the locking device from the coupling pin of the road trailer.

At all times the coupling element of the fifth-wheel of the road pulling vehicle is held by the end shoulders of the coupling pin against vertical displacement, and the same is true of my improved trailer protecting device, when the bolt hook or jaw is locked to the reduced midsection of the coupling pin of the trailer to be protected, as the bottom end shoulder of this coupling pin effectively resists the forcible removable of the locking device from the trailer coupling pin.

The shank of the bolt is made sufficiently long to enable the user to quickly couple the hook of the bolt on the shank of the trailer coupling pin, without actual hand contact with the coupling pin, which is usually covered with lubrication grease. Furthermore, the coupling may be effected from a standing position beyond the end of the trailer. It is not necessary to crawl under the trailer bed to reach the pin.

It is understood that various changes in the details of construction, their combination and substitution, may be carried out in adapting my invention for successful service use, without departing from the scope of the invention, as defined by the claims hereof.

In Fig. 8 I show a sleeve 13 having a small extension 13c, of smaller diameter, formed integral therewith.

Having described my invention I claim as new and patentable:

1. In combination with a road trailer having a coupling on one end thereof provided with a shoulder on its outer end and a cylindrical shank constructed to have pivotal coupling with the fifth wheel of a pulling road vehicle, a bolt approximately equal in length to the distance said coupling is spaced from the end of the trailer having a U-shaped terminal hook which receives the cylindrical shank of the coupling and is supported by the shoulder thereof, a sleeve shorter than said bolt and adapted to slide thereon, a head integral with said sleeve adapted to complement said hook in embracing said shank, and means extendable through said bolt to prevent movement of said sleeve with respect thereto, whereby said coupling is locked against coupling action with said fifth wheel.

2. Means for locking a road-trailer coupling pin having a peripheral shoulder formed thereon comprising a bolt having a long shank terminating in a rigid integral U-shaped hook adapted to embrace said coupling pin above said shoulder, an opening extending through said bolt near the end opposite said hook, an elongated sleeve shorter than said bolt and slidable thereon, said sleeve having an integral head adapted to embrace the portion of said pin opposite the closed end of said hook, said head having an opening therethrough adapted to receive the free end of said hook, an opening through said sleeve which is aligned with the opening through said bolt when said head is engaged with said pin, and locking means extendable through said bolt and sleeve openings to prevent relative movement between said shank and said sleeve when said head and said hook are engaged with said pin.

3. A locking device to prevent the theft of road trailers having a coupling pin engageable with the fifth wheel of a pulling road vehicle, said pin having a circumferential shoulder, said device comprising a bolt having a long rectangular shank provided with a U-shaped hook on one end thereof adapted to partly encircle and engage said pin above said shoulder, a first sleeve slidable on said shank having an integral head with a concave face for completing engagement of said pin above said shoulder, a second sleeve of smaller girth than said first sleeve slidable on said shank, a transverse opening through said second sleeve, an opening through said shank with which said transverse opening is aligned when said first and second sleeve are at the limit of their sliding movement toward said hook and padlock means having a hasp for extending through said aligned openings whereby said hook is prevented from passing over said shoulder to prevent said coupling pin from being coupled with the fifth wheel of a pulling road vehicle.

References Cited in the file of this patent

UNITED STATES PATENTS

| | | |
|---|---|---|
| 1,343,870 | James | June 15, 1920 |
| 1,415,662 | Levy | May 9, 1922 |
| 1,502,933 | Allen | July 29, 1924 |
| 1,752,613 | Proffen | Apr. 1, 1930 |
| 2,641,124 | Gallagher et al. | June 9, 1953 |